Feb. 14, 1933.  E. R. CANDOR  1,897,299
DISPENSING APPARATUS
Filed Dec. 31, 1927
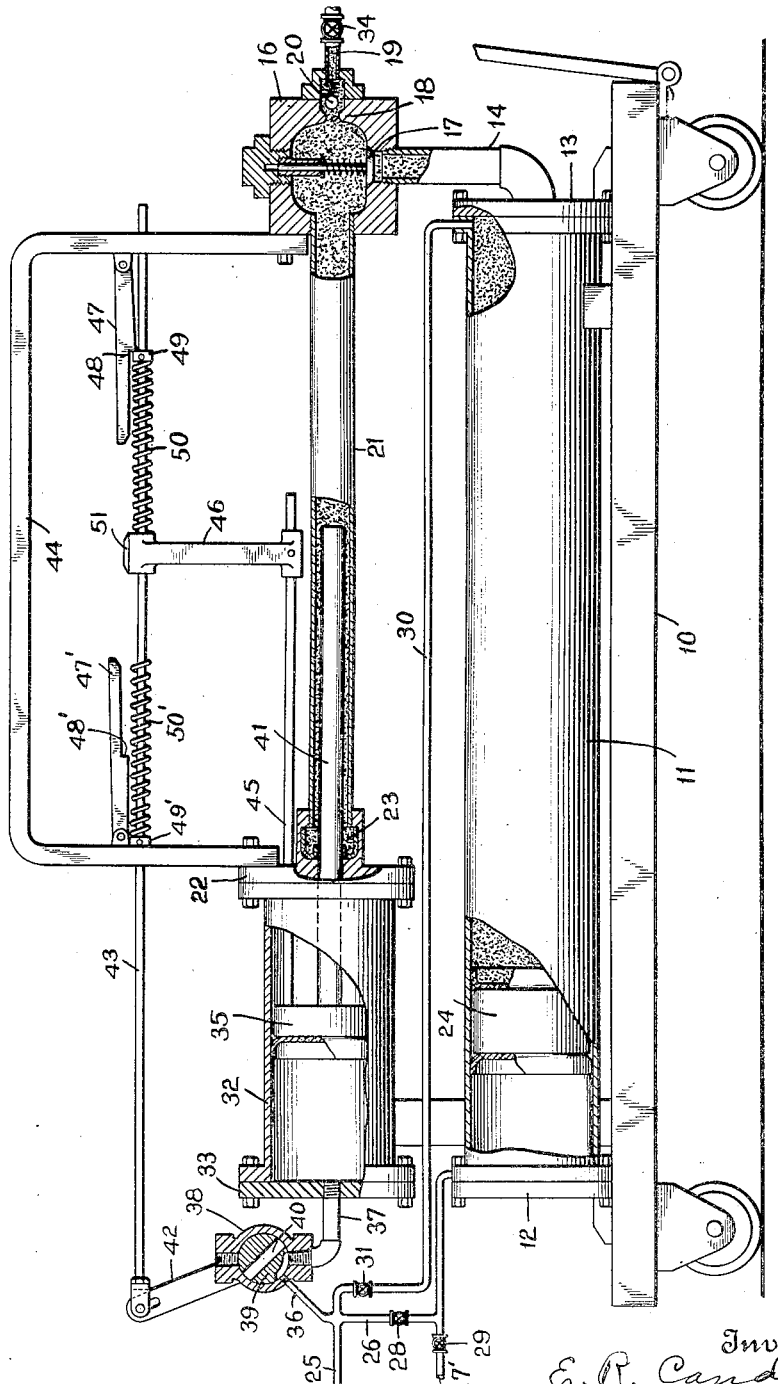
Inventor
E. R. Candor
By his Attorney
R. J. Dearborn Patented Feb. 14, 1933

1,897,299

UNITED STATES PATENT OFFICE

EDWARD RAMSAY CANDOR, OF MONTCLAIR, NEW JERSEY, ASSIGNOR TO THE TEXAS COMPANY, OF NEW YORK, N. Y., A CORPORATION OF DELAWARE

DISPENSING APPARATUS

Application filed December 31, 1927. Serial No. 243,779.

This invention relates to dispensing apparatus and more particularly to an apparatus for dispensing heavy greases for lubricating the large bearings of heavy automotive equipment, such for example as trucks and buses.

Operators of buses, trucks and the like, and particularly the operators of large fleets of such vehicles, are constantly confronted with the problem of maintaining them in continuous operation, and one of the largest factors contributing to such operation is thorough and sufficiently frequent lubrication. To thoroughly lubricate by hand one of the modern type heavy trucks or buses is a difficult and prolonged procedure and where a number of such vehicles must be regularly greased, hand greasing presents a real problem. Various methods of solving this problem have been proposed, but, so far as I am aware, none has proved to be entirely successful for use with the very heavy lubricants required.

I have designed an apparatus particularly adapted for the lubrication of large bearings, such as those of heavy trucks and buses, although obviously its use is not at all limited to such bearings and it may conveniently be used wherever it is desired to apply a heavy lubricant to bearings of large grease capacity. My invention contemplates the provision of a portable apparatus which can be moved from place to place, the only requirement being that some form of pressure fluid, preferably compressed air, be conveniently available, as the apparatus is operated by such fluid.

Accordingly, it is an object of my invention to provide a portable greasing apparatus adapted to be operated by a pressure fluid and by means of which grease or other lubricants may be speedily forced into large bearings or the like. Heavy lubricants move slowly because of their viscous nature and it is, therefore, another object of my invention to provide a greasing apparatus with large openings in order that the lubricant may be moved speedily and in comparatively large quantities.

Another object of the invention is to provide means for insuring that the working barrel of the pump is completely filled immediately prior to the beginning of the pressure stroke of the piston so that a full charge of lubricant can be delivered with each stroke of the piston.

Other objects, features and advantages of my invention will become apparent from the following detailed description thereof, taken in connection with the accompanying drawing.

Referring to the drawing, there is shown a view in side elevation of an apparatus embodying my invention, sections having been broken away to more clearly show the details of construction.

The greasing apparatus embodying my invention is mounted upon a portable truck 10, so that the apparatus may readily be moved from place to place as occasion may require. A storage chamber 11, preferably of cylindrical shape, is mounted upon the platform of the truck 10 and is suitably secured thereto. The ends of the storage chamber are closed by means of cover plates 12 and 13 which are secured to the flanged ends of the chambered member 11 in any convenient manner, but preferably by bolts and nuts so that they may be easily removed.

The cover plate 13 is provided with a relatively large centrally disposed threaded opening into which is secured one end of a relatively large pipe 14, the other end of which connects with a chambered member 16 constituting a valve chamber. A large check valve 17 is mounted within the chamber of the member 16 and is adapted to permit the passage of grease from the pipe 14 to the chamber, but to prevent the return of any grease from the chamber to the pipe. The chambered member 16 is also provided with a discharge opening 18 to which is connected an end of a discharge pipe or hose 19 provided with a control valve 34. A ball check valve 20 is so positioned within the restricted opening 18 as to permit the ready discharge of grease from the chamber of the member 16 through the outlet pipe 19, while preventing any return of grease from the pipe to the chamber. A third relatively large opening is provided in the wall of the chambered member 16 and in this opening there is secured one end of a tubular member or working barrel 21. The opposite end of the working barrel is attached to a cover plate 22 which is formed with an enlarged portion constituting a stuffing box 23.

The storage chamber 11 is fitted with a piston 24 adapted to be actuated by a pressure fluid such for example, as compressed air, which is supplied from a suitable source (not shown) through a pipe 25 and branch pipes 26 and 27, the latter having valves 28 and 29, respectively. A pipe 30 having a valve 31 connects the opposite end of the chamber 11 with the pipe 25 and when the piston 24 has completed its travel through the storage chamber 11 and it becomes necessary to again fill the chamber with grease, the valve 28 is first closed and the valve 29 is opened in order to relieve the pressure in the storage chamber. Valve 31 may then be opened and compressed air admitted to the opposite end of the storage chamber whereby the piston 24 is moved to the opposite end of the cylinder and if the cover plate 12 be first removed the piston will be completely discharged from the chamber 11 and the chamber can then be filled with a new charge of grease, the piston reinserted and the cover plate 12 again secured in place. The apparatus is then ready to begin operation again, but before operation can be commenced valves 31 and 29 must of course be closed and valve 28 opened to again permit the continuous application of pressure to the piston 24.

A flanged pressure cylinder 32 is suitably secured to the cover plate 22, its opposite end being closed by cover plate 33. A piston 35 is disposed within the cylinder 32 and is actuated by intermittent applications of compressed air taken from the pressure line 25 through branch pipes 36 and 37, the latter being in open communication with one end of the cylinder 32. A three-way valve comprising a casing 38 and a valve 39 is disposed between the branch pipes 36 and 37 and controls the passage of compressed air to the cylinder. In one position of the valve proper 39 (the position illustrated in the drawing) air passes freely from pipe 36 through the valve, then through pipe 37 and into the casing 32. In a second position of the valve 39 communication is cut off between pipes 36 and 37 and the air in the cylinder is quickly vented to the atmosphere through pipe 37 and a comparatively large port 40 in the valve 39. Valve 39 is operated in synchronism with piston 35 so that upon the completion of the pressure stroke of the piston the valve is quickly drawn into position to permit complete and rapid exhaust of air from the cylinder 32.

A plunger 41 extends through cover plate 22 and one end thereof is attached to piston 35 while the other end extends into and is adapted to reciprocate within the working barrel 21. On the pressure stroke of piston 35, plunger 41 is moved forward (to the right as shown on the drawing) so that pressure is applied to the contents of the barrel 21 and the chamber of member 16 to force grease under pressure and in large quantities at high pressure past check valve 20 and out through pipe connection 19 to the part to be lubricated. Check valve 17 prevents any return of grease to pipe 14.

Pressure is continuously applied to piston 24 so that as promptly as piston 35 reaches a predetermined point in its forward movement and valve 39 is moved into position to exhaust air from the cylinder 32 to the atmosphere, the piston 35 is free to move in the opposite direction and does so as a result of the pressure applied by the grease which is continuously being forced past check valve 17 and into the chamber of member 16 and working barrel 21. The pressure is applied to plunger 41 and as the plunger is moved in response to the application of this pressure the piston 35 is similarly moved until it reaches a predetermined point at which time valve 39 is again actuated to once more permit the entry of pressure fluid to the pressure cylinder 32. It now becomes apparent that at this point in the cycle of operation, the working barrel 21 is completely filled with grease.

In order that the valve 39 may not lag in its movement, means are provided for positively actuating the valve to promptly establish communication with either the pressure line or the exhaust line as desired. The means include a valve actuating arm 42 operatively connected to the valve 39, a rod 43 slidably mounted in a bracket or frame 44, which is suitably secured on the apparatus, the rod 43 being pivotally connected at one end to the arm 42. A second rod 45 extends through cover plate 22 and at one end is attached to piston 35. A connecting arm 46 is attached at one end to the projecting end of rod 45, so that any movement of piston 35 will produce a corresponding movement of arm 46. Opposed latches 47 and 47' are pivotally mounted on opposite sides of frame 44. Each latch is formed with a recess as at 48 and 48'. Each recess is adapted to engage one of a pair of spaced collars 49 and 49' secured on rod 43. Coil springs 50 and 50' are disposed between each of the collars 49 and 49' and the upper enlarged and bevelled end 51 of connecting arm 46.

When piston 35 is operating on the pressure stroke (or to the right as shown) collar 49 is engaged in recess 48 of latch 47. As arm 46 moves to the right in response to the movement of piston 35, spring 50 is compressed until the bevelled end 51 of arm 46 raises the bevelled end of latch 47 thus disengaging the recess 48 from the collar 49. At this movement the compressed spring 50 will suddenly thrust the rod 43 to the right with a resulting positive movement of valve 39 so as to quickly vent the contents of cylinder 32 to the atmosphere. This results in a lowering of the pressure in working barrel 21 to such a point that a new charge of grease is admitted from storage chamber 11 to chambered member 16 and barrel 21. At the completion of the right hand thrust movement of rod 43, the position of collar 49' is such that it engages recess 48' in latch 47' to hold it in a fixed position during the return movement of piston 41 and the parts attached thereto.

This return movement is produced by the grease introduced into working barrel 21 under pressure from chamber 11 and the operation of the latch mechanism is in all respects similar to that described in connection with the right hand movement or pressure stroke of the pistons 35 and 41, except that the movements are in the reverse direction, until valve 39 is again actuated to establish connection between the pressure cylinder 32 and pressure line 25. The operation is automatic and continues as long as there is a supply of grease in chamber 11 or until the discharge line 19 is closed by the control valve 34. When valve 34 is closed the pressures throughout the apparatus are balanced and movements cease making it possible for one operator to remotely control the apparatus during the greasing operation or when it is necessary to transfer the greasing connection from one bearing to another.

Apparatus of preferred form and construction has been illustrated and described for the purpose of showing a way in which this invention may be practiced, but the inventive thought upon which this application is based is broader than the illustrative embodiment thereof and no limitations are intended other than those imposed by the appended claims.

What I claim is:

1. A grease dispensing apparatus comprising a grease storage chamber, a valve chamber communicating with the storage chamber and formed with a discharge outlet, a check valve for preventing the contents of the valve chamber from re-entering the storage chamber, a working barrel in continuous open communication with the valve chamber, a plunger in the working barrel, means for admitting compressed air to one end of said grease storage chamber in order to continuously apply uniform pressure to the grease in said storage chamber and force said grease into the working barrel, means for applying pressure to the plunger in the working barrel to discharge grease through the discharge outlet in the valve chamber, and a valve in said discharge outlet for controlling the flow of grease therethrough and, when closed, for stopping the movement of the plunger and establishing a condition of balanced pressures throughout the entire apparatus.

2. In grease dispensing apparatus including a working barrel, a pressure actuated plunger for discharging grease under pressure from said barrel and a valve for intermittently admitting pressure to actuate the plunger on the pressure stroke and for relieving pressure on the return stroke, a valve actuating rod, spaced collars secured on said rod, a latch adapted to engage each of said collars, a pair of coil springs mounted on said rod between the collars, and means actuated by the plunger for alternately compressing said springs against one of said collars in accordance with the movement of the plunger, said means being adapted to alternately trip said latches to permit the compressed spring to suddenly expand and actuate the valve rod to operate the valve, and means comprising a cylinder, an air pressure operated piston and a column of grease between said piston and said plunger for actuating said plunger on its return stroke.

3. Grease dispensing apparatus comprising a working barrel, a pressure actuated plunger for discharging grease from said barrel under pressure, a grease storage chamber, a piston in said storage chamber, a source of compressed air, pipe connections between said source of compressed air and adjacent ends of said storage chamber and said working barrel, a double ported valve in one of said pipe connections for intermittently admitting compressed air to actuate said plunger on the pressure stroke and for relieving pressure from said plunger on the return stroke, means for actuating said valve comprising a valve actuating rod, a second rod fixed to said plunger, connections between said second rod and said valve actuating rod whereby said valve is reversed in position when said plunger reaches the end of a stroke in either direction, and a connection between the other ends of said storage chamber and said working barrel whereby said plunger is actuated on its return stroke by the pressure exerted on the grease in said grease storage chamber.

4. In a device of the type described, the combination of a pumping unit having a vent, and a container for substance to be pumped, a source of fluid pressure supply in constant communication with the container to normally urge the contents from said container, said pump unit having a connection with said container for receiving the substance discharged therefrom, said pump unit also having a connection with the source of fluid supply, a valve device associated with the pump unit and movable thereby to open the pump vent and close the fluid pressure supply at the termination of its discharge stroke, and close the pump vent and open the fluid pressure supply when the pump is in position for its power stroke, and a check valve in the connection between the container and pump and influenced by pressure of substance in the container to open the connection between the container and pump unit at the end of the power stroke of the pump unit, and close the connection between the container and pump unit at the beginning of the power stroke of the pump.

5. In a device of the type described, the combination of a pumping unit having a compression and a pumping chamber, and a double headed piston operable in said chambers, and a container for substance to be pumped, a source of fluid pressure supply in constant communication with the container to normally urge the contents from said container, the pumping chamber of the pump unit having a connection with said container for receiving the substance discharged therefrom, the compression chamber of the pump unit having a connection with the source of fluid supply and provided with a vent, a valve device associated with the pump unit and movable with the piston to open the vent and close the fluid pressure supply at the termination of the discharge stroke of the piston, and close the vent and open the fluid pressure supply when the piston is in position for its power stroke, and a check valve associated with the connection between the container and pumping chamber and influenced by pressure of substance in the container to open connection between the container and pump unit at the end of the power stroke of the piston, and close the connection between the container and pump unit at the beginning of the power stroke of the piston.

6. In a device of the type described, the combination of a pumping unit having a vent, and a container for substance to be pumped, a source of fluid pressure supply in constant communication with the container to normally urge the contents from said container, said pump unit having a connection with said container for receiving the substance discharged therefrom, said pump unit also having a connection with the source of fluid supply, a valve unit associated with the pump unit and having a pair of simultaneously operable valve devices movable respectively to open the pump vent and close the fluid pressure supply at the termination of the discharge stroke of the pump, and close the pump vent and open the fluid pressure supply when the pump is in position for its power stroke, and a check valve in the connection between the container and pump and influenced by pressure of substance in the container to open connection between the container and pump unit at the end of the power stroke of the pump unit, and close the connection between the container and pump unit at the beginning of the power stroke of the pump.

7. In a device of the type described, the combination of a differential pumping unit having a vent, and a container for substance to be pumped, a source of fluid pressure supply in constant communication with said container to normally urge the contents from said container, said pump unit having a connection with said container for receiving the substance discharged therefrom, said pump unit also having a connection with the source of fluid supply, a valve device associated with the pump unit and movable thereby to open the pump vent and close the fluid pressure supply at the termination of its discharge or power stroke, and close the pump vent and open the fluid pressure supply when the pump is in position for its power stroke, and a spring pressed check valve associated with the connection between the container and pump and influenced by pressure of substance in the container to open the connection between the container and pump unit at the end of the power stroke of the pump unit, and close the connection between the container and pump unit at the beginning of the power stroke of the pump.

8. In a device of the type described, the combination of a pumping unit having a compression and a pumping chamber, and a double headed differential piston operable in said chambers, and a container for substance to be pumped, a source of fluid pressure supply in constant communication with the container to normally urge the contents from said container, the pumping chamber of the pump unit having a connection with said container for receiving the substance discharged therefrom, the compression chamber of the pump unit having a connection with the source of fluid supply and provided with a vent, a valve device connected with the piston and movable thereby to open the vent and close the fluid pressure supply at the termination of the discharge stroke of the piston, and close the vent and open the fluid pressure supply when the piston is in position for its power stroke, and a check valve associated with the connection between the container and pumping chamber and influenced by pressure of substance in the container to open the connection between the container and pump unit at the end of the power stroke of the pump unit, and close the connection between the container and pump unit at the beginning of the power stroke of the pump, said valve being normally spring seated in its closing position.

9. In grease dispensing apparatus, a grease storage chamber, a piston in said chamber, a valve chamber communicating with the storage chamber and formed with a discharge outlet, a check valve for preventing the contents of the valve chamber from returning to the storage chamber, a working barrel in continuously open communication with the valve chamber, a plunger in the working barrel, means for continuously maintaining pressure on the piston in the storage chamber to insure a sufficient movement of grease to the working barrel to move said plunger in one direction, and means responsive to the movement of said plunger for operating the plunger to discharge the contents of the chamber and barrel through the discharge outlet under pressure.

In witness whereof I have hereunto set my hand this 1st day of December, 1927.

EDWARD RAMSAY CANDOR.